US009432107B2

(12) United States Patent
Kim

(10) Patent No.: US 9,432,107 B2
(45) Date of Patent: Aug. 30, 2016

(54) LOW-RATE DATA TRANSMISSION IN LTE BASED SATELLITE RATIO INTERFACE

(71) Applicant: Electronics and Telecommunications Research Institute, Daejeon (KR)

(72) Inventor: Hee Wook Kim, Daejeon (KR)

(73) Assignee: Electronics and Telecommunications Research Instit, Daejeon (KR)

( * ) Notice: Subject to any disclaimer, the term of this patent is extended or adjusted under 35 U.S.C. 154(b) by 0 days.

(21) Appl. No.: 14/835,332

(22) Filed: Aug. 25, 2015

(65) Prior Publication Data

US 2016/0127032 A1    May 5, 2016

(30) Foreign Application Priority Data

Nov. 5, 2014  (KR) .................... 10-2014-0152784

(51) Int. Cl.
*H04B 7/185* (2006.01)
*H04L 5/00* (2006.01)
*H04W 52/32* (2009.01)
*H04B 7/06* (2006.01)

(52) U.S. Cl.
CPC ............. *H04B 7/185* (2013.01); *H04L 5/0048* (2013.01); *H04W 52/32* (2013.01); *H04B 7/0678* (2013.01)

(58) Field of Classification Search
CPC .. H04B 7/185; H04B 7/0678; H04B 1/7107; H04B 1/7115; H04L 5/0048; H04L 1/0025; H04L 1/1812; H04W 52/32; H04W 72/042; H04W 52/146; H04W 52/16; H04W 52/325; H04W 52/327
See application file for complete search history.

(56) References Cited

U.S. PATENT DOCUMENTS

| 8,543,106 | B2 | 9/2013 | Kim et al. | |
|---|---|---|---|---|
| 2004/0258134 | A1 | 12/2004 | Cho et al. | |
| 2008/0080467 | A1 | 4/2008 | Pajukoski et al. | |
| 2011/0243066 | A1* | 10/2011 | Nayeb Nazar | H04L 1/007 370/328 |
| 2012/0026967 | A1 | 2/2012 | Pajukoski et al. | |
| 2012/0114017 | A1 | 5/2012 | Bang et al. | |
| 2013/0163536 | A1* | 6/2013 | Anderson | H04W 72/1284 370/329 |
| 2014/0098781 | A1* | 4/2014 | Vos | H04W 72/1268 370/330 |

(Continued)

FOREIGN PATENT DOCUMENTS

| KR | 100689382 B1 | 3/2007 |
|---|---|---|
| KR | 101085517 B1 | 11/2011 |
| WO | 2010029413 A1 | 3/2010 |

OTHER PUBLICATIONS

A.B. Awoseyila and B.G. Evans, Improved time diversity for LTE over satellite using split multicode transmission, IEEE letter, May 13, 2010, vol. 46 No. 10.

*Primary Examiner* — Hirdepal Singh
(74) *Attorney, Agent, or Firm* — William Park & Associates Ltd.

(57) ABSTRACT

Disclosed is a low-rate data transmission method in an LTE based satellite radio interface, which can secure a large number of low-rate data channels which can simultaneously access and increase frequency efficiency while providing compatibility with the existing LTE radio interface through a transmission technique which can secure more link margins in communication between portable terminals (handheld type terminals) without changing a basic LTE transmission frame structure in a satellite system requiring high transmission power.

13 Claims, 12 Drawing Sheets

(56) References Cited

U.S. PATENT DOCUMENTS

| | | | |
|---|---|---|---|
| 2015/0023274 A1* | 1/2015 | Morita | H04W 72/0406 370/329 |
| 2015/0156284 A1* | 6/2015 | Akhter | H04L 69/04 370/477 |
| 2015/0280802 A1* | 10/2015 | Thomas | H04L 27/2636 370/312 |
| 2016/0037352 A1* | 2/2016 | Wei | H04W 72/1268 455/454 |
| 2016/0094996 A1* | 3/2016 | Xiong | H04L 1/16 370/329 |

* cited by examiner

| SPREADING CODE LENGTH | TRANSPORT BLOCK SIZE | CODING BIT SIZE (bits) | CODING RATE, MODULATION METHOD |
|---|---|---|---|
| 4 | 20 | 80 | (QPSK,1/4) |
| | 40 | 80 | (QPSK,1/2) |
| | 40 | 160 | (16QAM,1/4) |
| | 80 | 160 | (16QAM,1/2) |
| | 80 | 240 | (64QAM,1/3) |
| | 120 | 240 | (64QAM,1/2) |
| 8 | 16 | 40 | (QPSK,2/5) |
| | 24 | 40 | (QPSK,3/5) |
| | 32 | 80 | (16QAM,2/5) |
| | 40 | 80 | (16QAM,1/2) |
| | 48 | 120 | (64QAM,2/5) |
| | 72 | 120 | (64QAM,3/5) |

| SPREADING CODE LENGTH | TRANSPORT BLOCK SIZE | CODING BIT SIZE (bits) | CODING RATE, MODULATION METHOD |
|---|---|---|---|
| 4 | 16 | 72 | (QPSK,1/4) |
| | 32 | 72 | (QPSK,1/2) |
| | 40 | 144 | (16QAM,5/18) |
| | 72 | 144 | (16QAM,1/2) |
| | 88 | 216 | (64QAM,11/27) |
| | 120 | 216 | (64QAM,5/9) |
| 8 | 16 | 36 | (QPSK,1/2) |
| | 24 | 72 | (QPSK,1/3) |
| | 36 | 72 | (16QAM,1/2) |
| | 36 | 108 | (16QAM,1/3) |
| | 72 | 108 | (64QAM,2/3) |

| SPREADING CODE LENGTH | TRANSPORT BLOCK SIZE | CODING BIT SIZE (bits) | CODING RATE, MODULATION METHOD |
|---|---|---|---|
| 12 | 6 | 24 | (QPSK, 1/4) |
| | 12 | 24 | (QPSK, 1/2) |
| | 16 | 24 | (QPSK, 2/3) |
| | 12 | 48 | (16QAM, 1/4) |
| | 24 | 48 | (16QAM, 1/2) |
| | 32 | 48 | (16QAM, 2/3) |
| | 18 | 72 | (64QAM, 1/4) |
| | 36 | 72 | (64QAM, 1/2) |
| | 48 | 72 | (64QAM, 2/3) |

F I G. 8

LOW-RATE DATA TRANSMISSION IN LTE BASED SATELLITE RATIO INTERFACE

CROSS-REFERENCE TO RELATED APPLICATIONS

This application claims priority to and the benefit of Korean Patent Application No. 10-2014-0152784 filed in the Korean Intellectual Property Office on Nov. 5, 2014, the entire contents of which are incorporated herein by reference.

TECHNICAL FIELD

The present invention relates to low-rate data transmission in an LTE based satellite radio interface, and more particularly, to a transmission method for securing a large number of low-rate data channels with compatibility with the existing LTE radio interface through a transmission technique which can secure more link margins while not changing a basic LTE transmission frame structure under a satellite system environment requiring high transmission power.

BACKGROUND ART

A DFTS-OFDM based single carrier transmitting method is used in an uplink of LTE mobile communication. The reason for using a single carrier modulating method in the uplink is that a peak-to-average power ratio (PAPR) is lower in the single carrier transmitting method than in a multi-carrier transmission method such as OFDM. As the PAPR of a transmitted signal is smaller and smaller, average transmission power can be increased with respect to a given power amplifier. Accordingly, single carrier transmission brings about higher power amplifier efficiency and this means an increase in coverage and a decrease in consumption of terminal power. Simultaneously, the single carrier transmission which occurs by selective frequency fading brings about the higher power amplifier efficiency and this means, that is, the increase in coverage and the decrease in consumption of the terminal power.

In spite of the same carrier transmitting method, an LTE uplink is based on orthogonal transmission in which uplink transmission is orthogonally split in a time domain and/or a frequency domain in contrast with a WCDMA/HSPA uplink which is non-orthogonal transmission. Since the orthogonal transmission can avoid intra-cell interference, the orthogonal transmission is more advantageous than the non-orthogonal transmission. However, allocating a very large instantaneous bandwidth resource for transmission from a single user equipment is not an efficient strategy under a situation in which a data rate is primarily limited by transmission power of the user equipment rather than a bandwidth. Under this situation, the corresponding user equipment is allocated with only a part of an entire bandwidth and simultaneously, other user equipments can transmit the signal by using a remaining spectrum part in an entire available bandwidth. Accordingly, since the LTE uplink has multiple connection elements in the frequency domain, the LTE uplink transmission method is called SC-FDMA.

A basic structure of DFTS-OFDM transmission in which M discrete Fourier transforms (DFTs) are applied to blocks of M modulated symbols is summarized. A DFT output is generally mapped to a selective input into an OFDM modulator implemented by inverse FFT (IFFT). The DFT output is generally mapped to the selective input into the OFDM modulator implemented by the inverse FFT (IFFT). The size of the DFT decides an instantaneous bandwidth of the transmitted signal and the mapping of the DFT output into the input of the OFDM modulator decides the position of the transmitted signal in an entire uplink cell bandwidth. Thereafter, a cyclic prefix (CP) is inserted into each DFT block. The LTE uplink transmission is limited to localized transmission, and as a result, the output of the DFT is continuously mapped to a consecutive input of the OFDM modulator.

In the LTE, as intermediate compromise between two purposes of easiness of implementation and flexibility of resource allocation, a DFT symbol size is limited to a value acquired by combining and multiplying 2, 3, and 5. For example, the DFT having sizes of 60, 72, and 96 is permitted, but DFT having a size of 84 is not permitted. In this method, the DFT is implemented by combining radix-2, radix-3, and radix-5 FFT processing having comparatively low complexity.

Basic parameters of the LTE uplink transmission method are decided to maximally coincide with parameters of an OFDM based LTE downlink. In general, an uplink subcarrier interval is 15 kHz in the LTE uplink transmission method and a resource block constituted by 12 subcarriers is defined even in the LTE uplink. Similarly to the downlink, even in the uplink, an LTE physical layer specification enables the number of various uplink resource blocks which is minimum 6 to maximum 110 to be used to achieve high flexibility in terms of the entire cell bandwidth. The LTE uplink is very similar to the downlink even in terms of a time domain structure. Each 1-ms uplink subframe is constituted by two slots having a length of 0.5 ms. Each slot is constituted by several DFTS-OFDM symbols including the CP. Further, similarly to the downlink, the lengths of two CPs of a general CP and an extended CP are defined even in the uplink.

Meanwhile, in a satellite system, high-output signal transmission is required due to a small link margin. 180 kHz which is a basic uplink transport block size in the LTE has a disadvantage in that power allocated in each subcarrier of a basic transport block cannot provide transmission power which can satisfy the link margin of the satellite system when a lower maximum transmission power level of a handheld type terminal is considered. Further, a basic transport block size of 180 kHz is provided in a 1-ms subframe length which is a minimum unit of the resource allocation, and in the case of Antenna Port 1, since 160 resource elements (REs) are provided as the minimum resource allocation unit, a data rate of 160 symbol/s cannot be supported and a low-rate data service of 16 kbps or less cannot be supported on an LTE radio interface standard specification. This imposes a limitation to the number of simultaneous access users.

SUMMARY OF THE INVENTION

The present invention has been made in an effort to provide a low-rate data transmission method in an LTE based satellite radio interface, which can secure a large number of low-rate data channels which can simultaneously access and increase frequency efficiency while providing compatibility with the existing LTE radio interface through a transmission technique which can secure more link margins in communication between portable terminals (handheld type terminals) without changing a basic LTE transmission frame structure in a satellite system requiring high transmission power.

An exemplary embodiment of the present invention provides a low-rate data transmission method in a radio interface, including: allocating transmission data to resource elements of a basic transport block to which a spreading code is applied, to be shared by a plurality of target UEs; and transmitting data based on the spreading code through the basic transport block for signal transmission, and the plurality of target UEs share the same basic transport block to transmit data by using the corresponding spreading code.

In communication of portable terminals for LTE based satellite communication, the spreading code may be applied to the basic transport block while maintaining compatibility with the existing radio interface and a link margin may be improved by sharing the basic transport block to support the low-rate data transmission.

The spreading code corresponding to the transport block size which decreases as compared with the existing LTE may be applied to the plurality of target UEs allocated to the basic transport block and each transmission data may spread to allow transmission target UEs of the number corresponding to a maximum length of the spreading code to transmit data through the same basic transport block.

The basic transport block may include a resource constituted by 12 subcarriers having a size of 15 kHz and one subframe having a size of 1 ms.

The method may further include: determining, by a base station, whether a corresponding UE is a UE which is able to transmit a signal by sharing the basic transport block based on the spreading code; and allocating, by the base station, the existing LTE transport resource block to UEs which are not able to transmit the signal based on the spreading code and allocating the basic transport block for transmitting the signal based on the spreading code to UEs which are able to transmit the signal based on the spreading code to share the basic transport block to allow the plurality of target UEs to transmit data by sharing the basic transport block.

The allocating may include coding the transmission data with the MN/L (M represents the number of the resource elements (REs) of the basic transport block, L represents the length of the spreading code, and N represents the number of bits per symbol depending on the modulation method) coding size, dividing the coded data into an I axis and a Q axis and modulating the divided data by a predetermined modulation method, applying the spreading code to the I axis and the Q axis of the modulated data, and allocating the I-axis and Q-axis data to which the spreading code is applied, to the respective resource elements.

The plurality of target UEs that share the basic transport block may transmit transmission data to which spreading codes orthogonal to each other are applied.

In the coding, the data may be coded by using a convolutional code.

The spreading code may include a Hadamard code having a length of 4 or 8, in which orthogonal variable spreading factor (OVSF) channelization is available.

In the allocating, the spreading code may be applied by using the information on the spreading code added to the reserved field of the physical downlink control channel (PDCCH) or using a predetermined PDCCH channel which is not used for the satellite communication.

A narrowband transmission channel that shares the basic transport block may be separated from the existing LTE transmission channel to transmit data, thereby maintaining the compatibility with the existing LTE UE.

The spreading code may include a discrete Fourier transform (DFT) sequence, a CAZAC sequence, or a Zadoff-Chu sequence having a length of 12.

The convolutional code may be applied to the corresponding transport block size which decreases as compared with the existing LTE and a low-rate data service including a text message based on the spreading code may be supported.

Another exemplary embodiment of the present invention provides a low-rate data transmission method in a radio interface, including: generating a reference signal for demodulation; allocating the reference signal generated to have orthogonality to each other with respect to a plurality of target UEs to resource elements of a basic transport block; and transmitting the reference signal through the basic transport block for signal transmission, and the plurality of target UEs share the same basic transport block to transmit data by using a corresponding spreading code.

The method may further include: in order to transmit data based on the spreading code by allocating transmission data to the resource elements of the basic transport block, coding the transmission data with the MN/L (M represents the number of the resource elements (REs) of the basic transport block, L represents the length of the spreading code, and N represents the number of bits per symbol depending on the modulation method) coding size; dividing the coded data into an I axis and a Q axis and modulating the divided data by a predetermined modulation method; applying the spreading code to the I axis and the Q axis of the modulated data, and allocating the I-axis and Q-axis data to which the spreading code is applied, to the respective resource elements.

According to an exemplary embodiment of the present invention, a low-rate data transmission method in an LTE based satellite radio interface is applied to a satellite system requiring high transmission power to use a basic LTE transmission frame structure, portable user equipments share and use a basic transport block constituted by 12 subcarriers having a size of 15 kHz and one subcarrier having a size of 1 ms and data adopted with spreading codes are allocated and transmitted to resource elements (REs) included in the basic transport block to secure more link margins in communication between user equipments, secure low-data channels of a large number as possible, which can simultaneously access while providing compatibility with the existing LTE radio interface, and increase frequency efficiency.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

BRIEF DESCRIPTION OF THE DRAWINGS

FIGS. 1A and 1B illustrate an example when the length of a Hadamard code is 4 in an LTE downlink data frame structure according to an exemplary embodiment of the present invention.

Figure 2A:
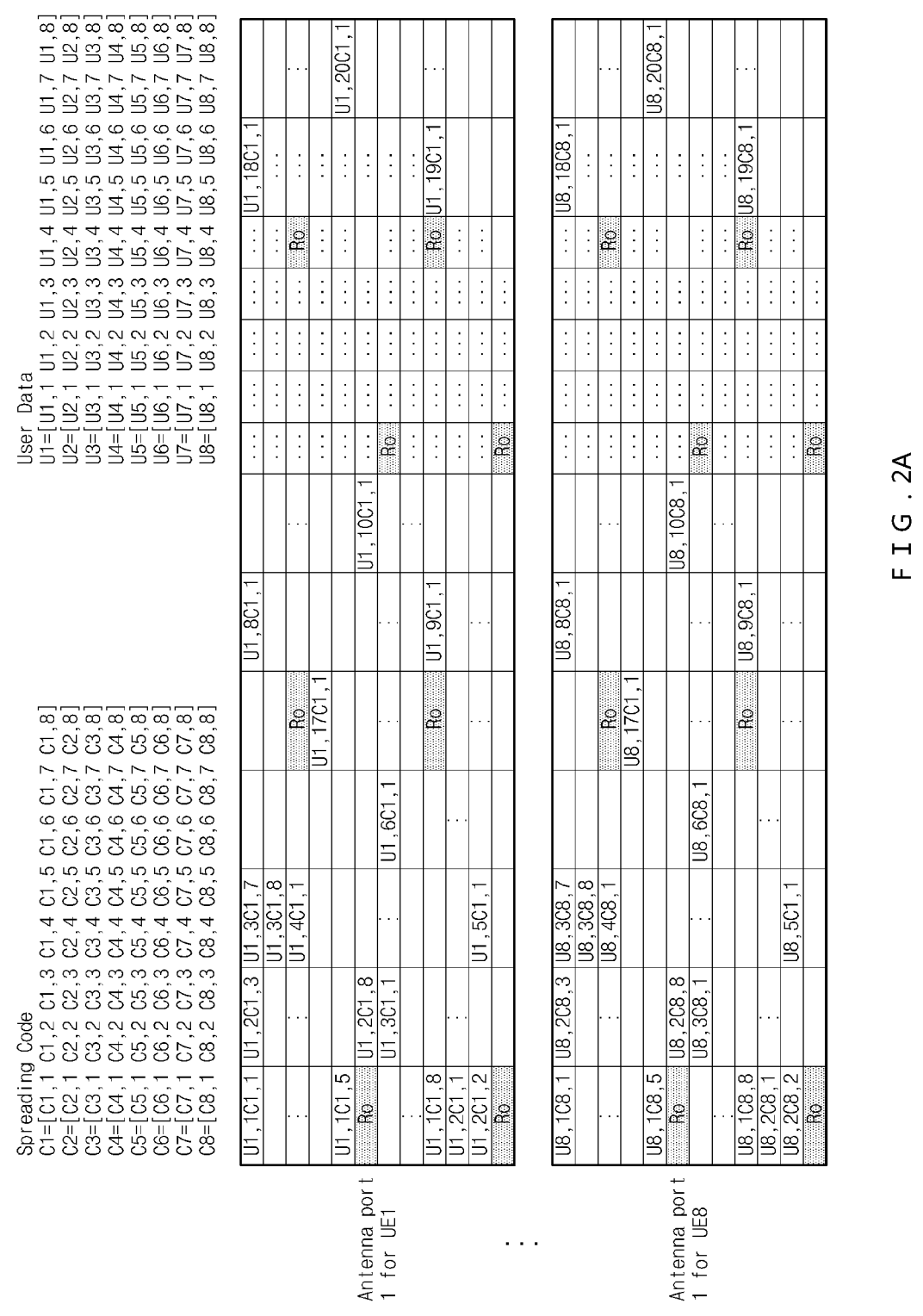

FIGS. 2A and 2B illustrate an example when the length of the Hadamard spreading code is 8 in the LTE downlink data frame structure according to the exemplary embodiment of the present invention.

FIG. 3 illustrates an example of various low-rate data transmission methods in a user equipment depending on various modulation methods and coding rates in the present invention.

FIGS. 5A and 5B are diagrams for describing an uplink data frame structure using a physical uplink share channel (PUSCH) signal channel for LTE uplink narrowband transmission according to an exemplary embodiment of the present invention.

FIG. 6 illustrates another example of various low-rate data transmission methods in the user equipment depending on various modulation methods and coding rates in the present invention.

FIG. 7 illustrates an example of subframes in case of spreading coding using a discrete Fourier transform (DFT) sequence, a CAZAC sequence, or a Zadoff-Chu sequence having a spreading code length of 12 in an uplink.

FIG. 8 illustrates yet another example of various low-rate data transmission methods in the user equipment depending on various modulation methods and coding rates in the present invention.

Figure 2B:
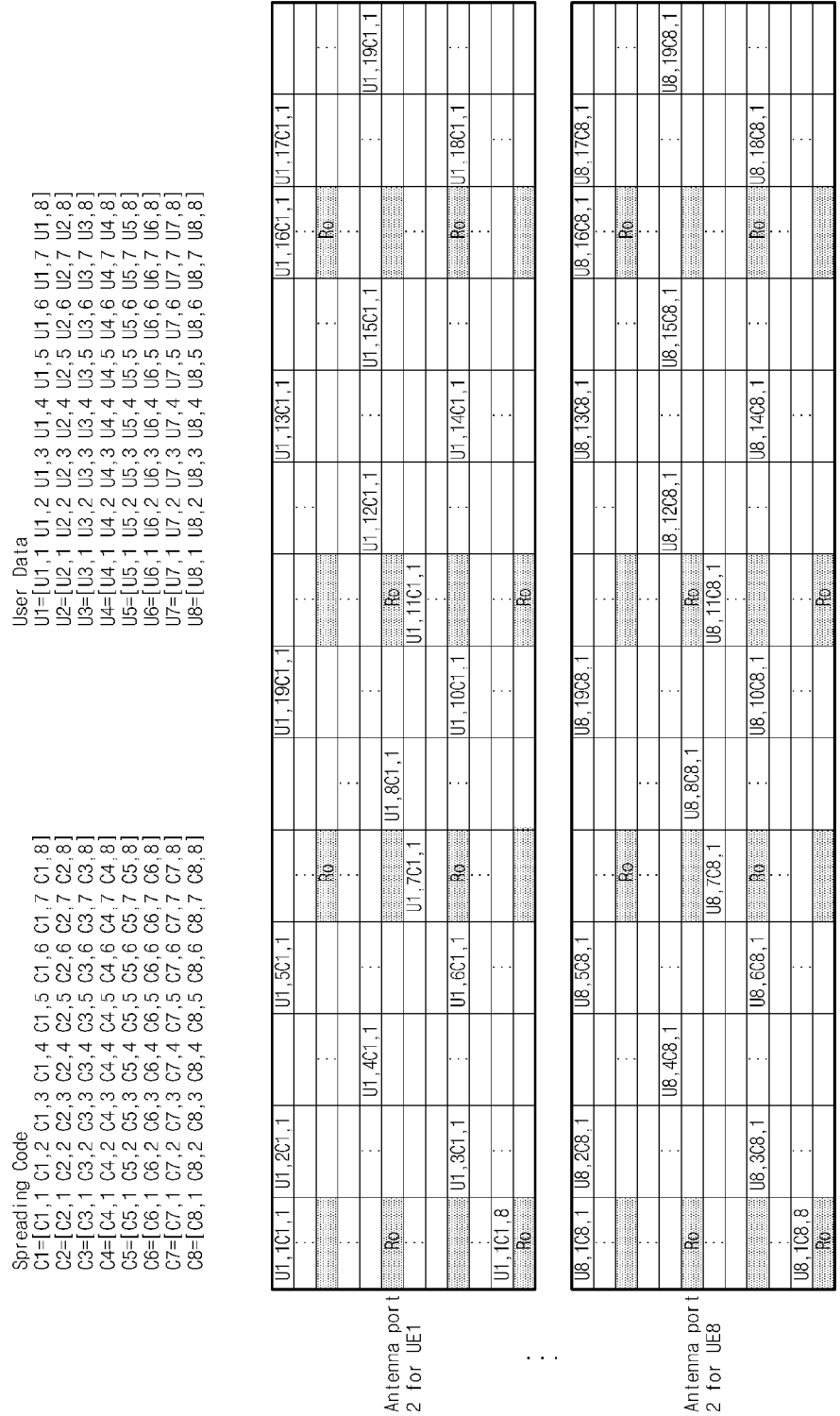

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the present invention will be described in detail with reference to the accompanying drawings. In this case, like reference numerals refer to like elements in the respective drawings. Further, a detailed description of an already known function and/or configuration will be skipped. In contents disclosed hereinbelow, a part required for understanding an operation according to various exemplary embodiments will be described in priority and a description of elements which may obscure the spirit of the present invention will be skipped. Further, some components of the drawings may be enlarged, omitted, or schematically illustrated. An actual size is not fully reflected on the size of each component and therefore, contents disclosed herein are not limited by relative sizes or intervals of the components drawn in the respective drawings.

Figure 1A:
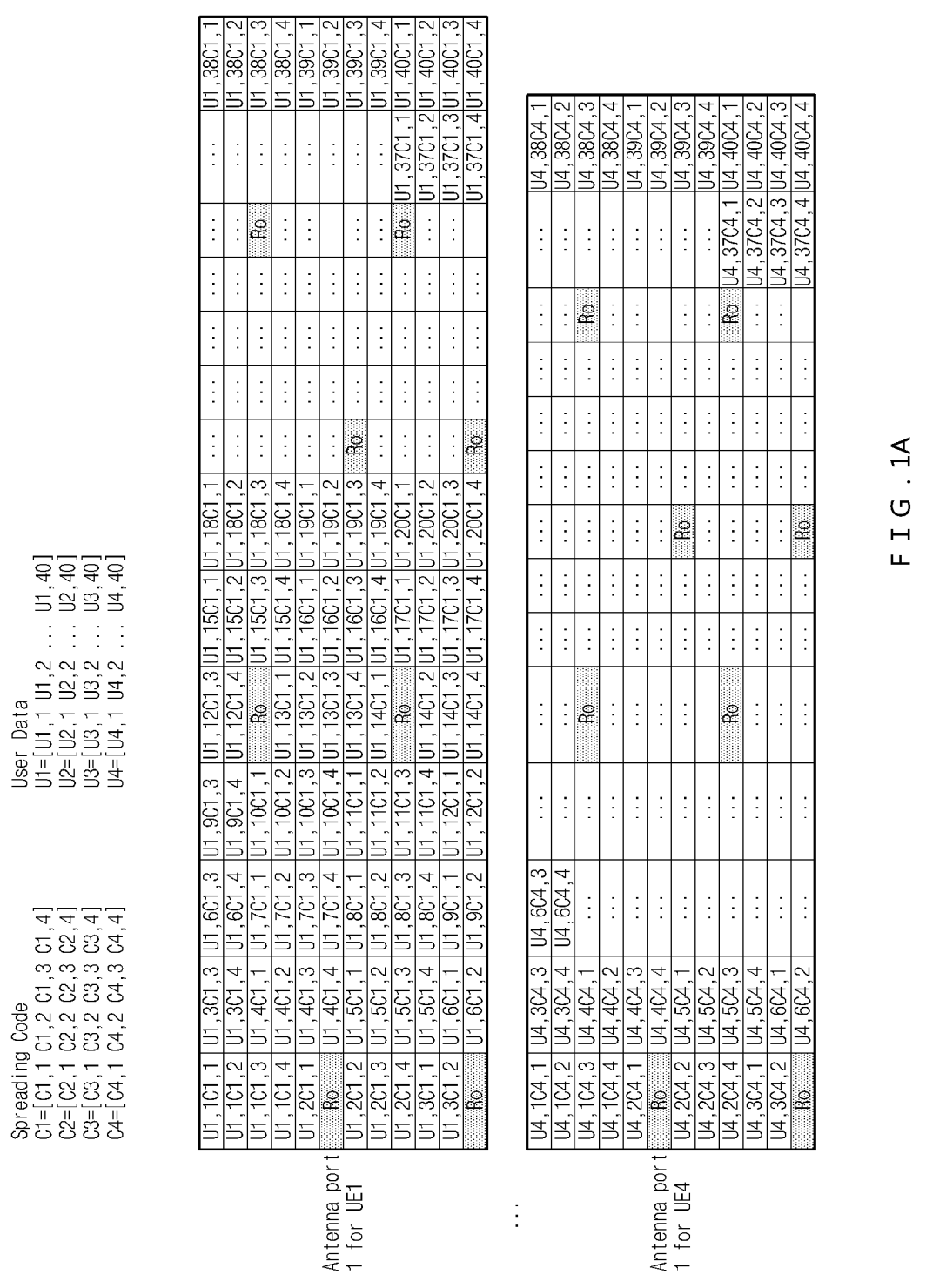
Figure 1B:
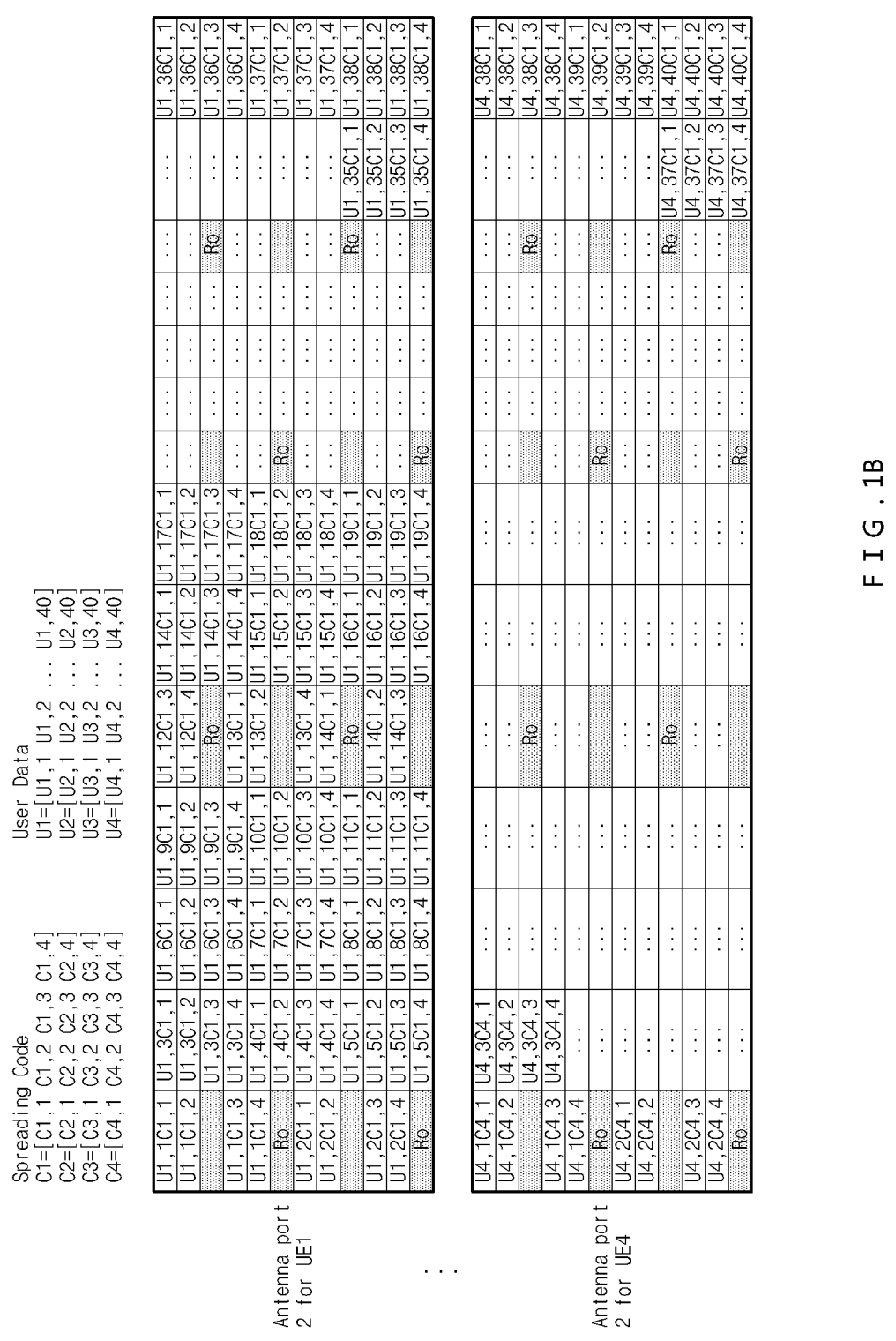

FIGS. 1A and 1B illustrate an example when the length of a Hadamard code is 4 in an LTE downlink data frame structure according to an exemplary embodiment of the present invention.

FIGS. 1A and 1B illustrate, as a legend, types of user data U1, U2, U3, and U4 corresponding to spreading codes C1, C2, C3, and C4 when antenna ports 1, 2, 3, and 4 which may be allocated to UEs 1, 2, 3, and 4 and illustrate, on a table, data which is transmitted in a channel of each RE while each UE is allocated to each antenna port. "?" on the table represents that spreading data of user data is omitted.

The size (minimum resource allocation unit) of a basic transport block (TB) in the existing LTE uplink radio interface is constituted by 12 subcarriers having a bandwidth of 15 kHz and 7 OFDM symbols (in the case of the normal CP) or 6 OFDM symbols (in the case of the extended CP) in one subframe having a size of 1 ms. The transport block size and the 15 kHZ subcarrier bandwidth are used without a change in order to maximally maintain compatibility with the existing LTE radio interface in the low-rate data transmission of the present invention. The low-rate data transmission may just reuse a transmission parameter and a chipset for the existing LTE radio interface without changing the 15 kHz subcarrier bandwidth and since a transport block (TB) of the existing LTE chipset may be used without changing the transport block size, multiplexing and coding of the existing LTE may be used as it is. However, a method for decreasing the existing LTE transport block size is also considered for lower-speed data transmission than the existing LTE together with securing the link margin.

That is, it is advantageous in maximum commonality with the existing LTE through least modification of a physical layer and a media access control (MAC) layer. First, the case of a downlink will be described. For example, the spreading code illustrated in FIGS. 1A and 1B may be used in order to secure the link margin while making the basic transport block size be the same as the existing LTE. That is, different types of information is not transmitted and the same type of information is transmitted to various resource elements (REs, resource blocks) through each antenna port to secure the link margin and the information is transmitted through the spreading code to allow various users to share and use the resource block such as the basic transport block. Herein, as the spreading code, any code widely used as the existing spreading code, such as a Hadamard code or a Gold code may also be used. In the case of the downlink, since all user signals synchronize with an own signal of a user equipment, it is advantageous in applying orthogonal variable spreading factor (OVSF) channelization such as the Hadamard code that shows optimal performance in the case of inter-code synchronization. Further, as known in the downlink frame structure of FIGS. 1A and 1B, the number of remaining REs other than a reference signal (RS) in the basic transport block in one subframe is a multiple of 4 and 8. Further, since the sizes of all transport blocks are the multiple of 4 and 8 on an LTE specification, when the length of the spreading code is 4 and 8, it is easy to maintain the compatibility with the existing LTE specification.

Since the Hadamard code has a length of $2^n$ (n is an integer larger than 0), spreading coding is advantageous by using the Hadamard code having the length of 4 or 8. When the Hadamard code has the length of 8, a low-rate data rate which one user may support is higher twice, but the number of user equipments that share and use one basic transport block is as small as ½, and as a result, the length of the spreading code may be appropriately selected according to a system requirement. FIGS. 1A and 1B illustrate the case in which spreading is performed with the Hadamard code in which the length of the spreading code is 4. Since the length of the spreading code of 4 is used, four user equipments may share and use the same resource block and FIGS. 1A and 1B illustrate a method that first allocates spread data of the user equipment to a frequency axis (vertical axis) and thereafter, sequentially allocates the data to a time axis (horizontal axis). The method that allocates the spread data of the user equipment may be a method that first allocates the spread data to the time axis and thereafter, allocates the spread data to the frequency axis unlike FIGS. 1A and 1B and the spread data may be allocated by a method that maximally allocates signal spread in the same user data to the same frequency axis or the spread data may be allocated to be optimized to an environment in which other systems operate. In the case of Antenna port 1 of FIG. 1A, since 160 REs exist in the basic transport block, actual data may be actually transmitted to 40 REs for each user equipment and in the case of Antenna port 2 of FIG. 1B, since 152 REs exist in the basic transport block, the actual data may be transmitted to 38 REs for each user equipment. Herein, user equipments that share one resource block have the same adaptive modulation and coding (AMC) format in order to facilitate the resource allocation without interference between signals of the user equipments. That is, user equipments that receive a similar type of service (e.g., voice) perform the resource allocation to share the resource block.

FIGS. 2A and 2B illustrate an example when the length of the Hadamard code is 8 in the LTE downlink data frame structure according to the exemplary embodiment of the present invention.

Since the length of the spreading code of 8 is used, eight user equipments may share and use the same resource block and FIGS. 2A and 2B illustrate a method that first allocates spread data of the user equipment to the frequency axis and thereafter, sequentially allocates the data to the time axis. In a method that allocates the spread data by spreading code having orthogonality to each other between the user equipments, the spread data may be first allocated to the time axis and thereafter, the spread data may be allocated to the frequency axis unlike FIGS. 2A and 2B, the signal spread in the same user data may be allocated by a method that maximally allocates the spread signal to the same frequency axis or the spread signal may be allocated to be optimized to the environment in which other systems operate. In the case of Antenna port 1 of FIG. 2A, since 160 REs exist, the actual data may be actually transmitted to 20 REs for each user equipment and in the case of Antenna port 2 of FIG. 2B, since 152 REs exist, the actual data may be transmitted to 19 REs for each user equipment. Herein, the user equipments that share one resource block have the same adaptive modulation and coding (AMC) format in order to facilitate the resource allocation without interference between signals of the user equipments. That is, the user equipments that receive the similar type of service (e.g., voice) perform the resource allocation to share the resource block.

As described above, in the case of a user equipment (UE) that shares one basic transport block (TB) by using the spreading code, when the spreading code length is L and the number of REs of one basic transport block is M, the number of resources to which the actual data may be allocated decreases to M/L. When the number of bits per symbol depending on the modulation method is N, the number of coding bits may be MN/L. Herein, L may vary depending on the modulation method and for example, L may have 2 when the modulation method is QPSK, 4 when the modulation method is 16QAM, and 6 when the modulation method is 64QAM. For example, in Antenna port 1, when the size of the basic transport block is 160 and the length of the spreading code is 4, the number of REs which may be actually allocated for data transmission of one user equipment is 40. That is, the number of the basic transport blocks is 160 in the existing LTE, while data of the transport block needs to be applied to 40 REs in the method of the present invention. That is, when the QPSK, the 16QAM, and the 64 QAM are considered, the sizes of bits coded from the data of the transport block are 80, 160, and 240 (see FIG. 3). That is, since the number of coding bits is small, performance deteriorates at the time of using a turbo code used for the existing LTE data transmission. Accordingly, in the present invention, signal transmission for user equipments that share one transport block (TB) by using the spreading code prevents deterioration of the performance even with respect to a small coding size through coding using a convolutional code without using the turbo code of the existing LTE. In the case of the transport block size, the transport block size of the LTE is changed to maintain the compatibility with the existing LTE, the existing LTE transport block sizes are coded with the convolutional code, and the coded bit spreads through the spreading code and thereafter, is allocated to each RE of one transport block.

FIG. 3 illustrates an example of various low-rate data transmission methods in a user equipment (UE) depending on various modulation method sand coding rates in the present invention.

It can be seen that various low-rate data may be transmitted according to various modulation method and coding rates in the user equipment (UE) as illustrated in FIG. 3 by such a method. In FIG. 3, when the spreading code length is 8, since the transport block size is the same as the transport block size supported on the basic LTE specification, compatibility with the existing LTE data format may be provided. Of course, a value other than the transport block size supported on the LTE specification may be applied and in this case, it is advantageous that the value may be applied to low-rate data transmission adopting the spreading code depending on the efficient modulation and coding method in low-rate data transmission having a lower speed.

Meanwhile, various user equipment signals share the basic LTE transport block by adopting the spreading code, and as a result, a base station needs to notify, to the user equipment, which user equipment signal shares the basic LTE transport block and what the spreading code allocated to the user equipment that shares the basic transport block is, for the low-rate data transmission. In the case of the existing LTE, what the transport block (identifier) allocated to each user is and what a transport parameter is in each transport block are notified through a physical downlink control channel (PDCCH) downlink channel Therefore, spreading code information applied to the user equipment is added to a reserved field of the existing PDCCH channel to be notified to the UE by using the existing PDCCH channel. Further, in the existing LTE, like a PDCCH channel used for 4*4 multi-input and multi-output (MIMO) or 8*8 MIMO, a method may also be considered, which just uses a field of the channel for the purpose of the present invention by using a PDCCH channel having an appropriate size and an appropriate format among the existing LTE PDCCH channels which are not used for a purpose of a satellite mobile communication system or changing and uses the field to be suitable for transferring low-rate data transmission control information of the present invention.

Figure 4:
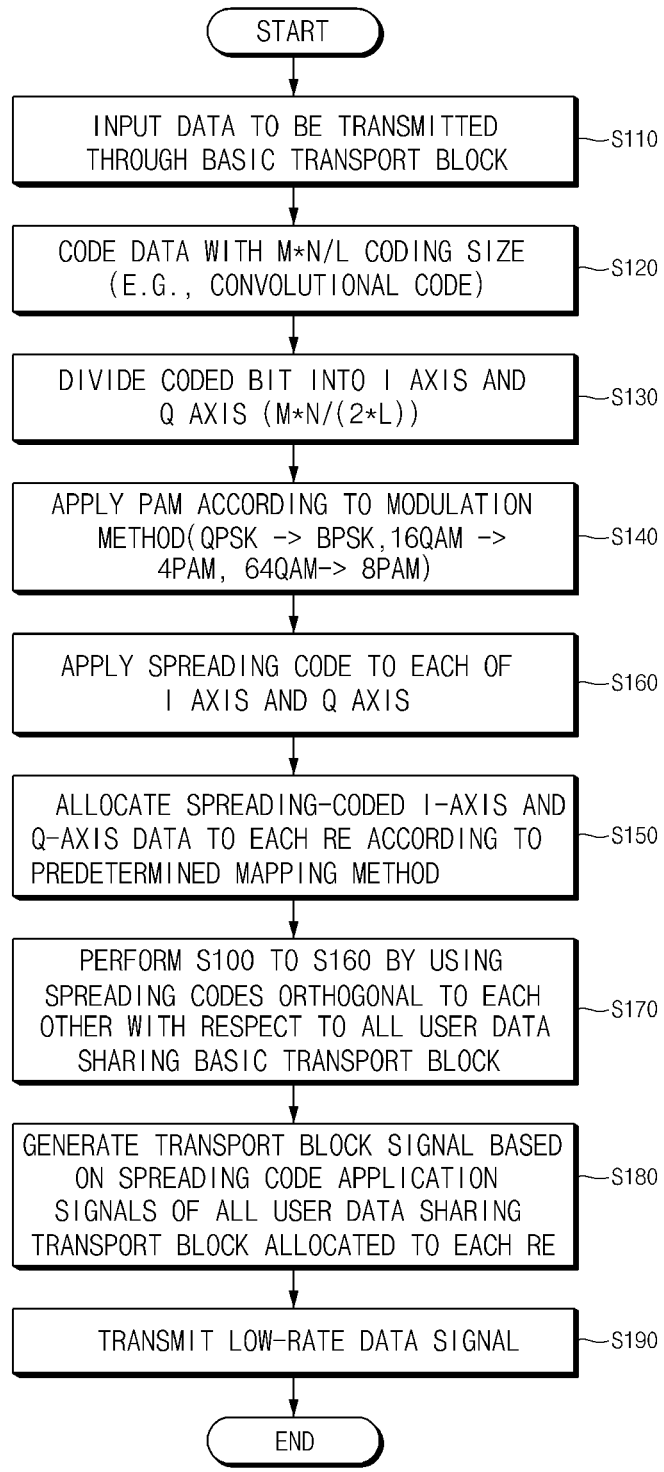
FIG. 4 illustrates an example of a flowchart for describing a low-rate data transmission method in a user equipment (UE) using a spreading code in the present invention.

Hereinafter, the low-rate data transmission method in the user equipment (UE) using the spreading code according to the exemplary embodiment of the present invention will be described in more detail with reference to the flowchart of FIG. 4.

A plurality of target UEs share the same basic transport block to transmit respective data by using the corresponding spreading data. To this end, a radio interface such as a modem, a transmitter, or a transceiver installed in a communication apparatus such as a portable terminal of the present invention allocates transmission data to the resource element (RE) of the basic transport block to transmit the spreading code based data through the basic transport block and first receives the transmission data to be transmitted through the basic transport block (S110). Herein, as the radio interface, a satellite radio interface for communication with the satellite is described as an example, but the radio interface may be applied even to interfaces installed in various systems requiring the high transmission power.

As a result, in the radio interface, the transmission data to be transmitted through the basic transport block is first coded with the MN/L (M represents the number of the resource elements (REs) of the basic transport block, L represents the length of the spreading code, and N represents the number of bits per symbol depending on the modulation method) coding size (S120). In this case, as described even above, the data may be coded by using the convolutional code. Further, herein, the radio interface may appropriately select the aforementioned spreading code according to a channel state, and the like.

The radio interface modulates the coded data in the corresponding modulation method by selecting predetermined modulation methods such as QPSK, QAM, and the like according to the channel state, and the like (S140) by dividing into an imaginary (I) axis and a quadrature (Q) axis (S130). For example, as well known, the BPSK and four phases are applied to predetermined signals in each modulation method to perform the QPSK modulation and pulse amplitude modulation (PAM) is applied to the predetermined signals to perform the QAM modulation.

Next, in the radio interface, the spreading code described above is applied to the I axis and the Q axis of the modulated data (S150) and the I-axis and Q-axis data to which the spreading code are allocated to the respective resource elements according to a predetermined mapping method (S160). As described even above, by using the information on the spreading code added to the reserved field of the physical downlink control channel (PDCCH) or using a predetermined PDCCH channel which is not used for the satellite communication in the base station, the radio interface applies the corresponding spreading code.

Steps S110 to S160 may be performed in the plurality of target UEs that share the basic transport block (S170) and in this case, the plurality of target UEs that share the basic transport block apply the spreading codes which have orthogonality to each other and for example, the spreading code such as the Hadamard code having the length of 4 or 8 in which the aforementioned orthogonal variable spreading factor (OVSF) channelization may be used.

The spreading code based transmission data in the plurality of respective target UEs is loaded on the basic transport block to be generated as a predetermined transport block signal as described above (S180) and the transmission data may be transmitted through the corresponding narrowband transmission channel (S190). In the present invention, the narrowband transmission channel that shares the basic transport block is separated from the existing LTE transmission channel to transmit data, thereby maintaining the compatibility with the existing LTE UE. Further, in the present invention the convolutional code is applied to the corresponding transport block size which decreases as compared with the existing LTE in the satellite communication and it may be advantageous to support the low-rate data service including a spreading code based text message.

As described above, in the present invention, the spreading code corresponding to the transport block size which decreases as compared with the existing LTE is applied to the plurality of target UEs allocated to the basic transport block and each transmission data spreads to allow transmission target UEs of the number corresponding to a maximum length of the spreading code to transmit data through the same basic transport block. Further, in communication of the portable terminals for the LTE based satellite communication, the spreading code is applied to the basic transport block while maintaining the compatibility with the existing radio interface and the link margin is improved by sharing the basic transport block to easily support the low-rate data transmission.

Next, the case of an uplink will be described.

Figure 5A:
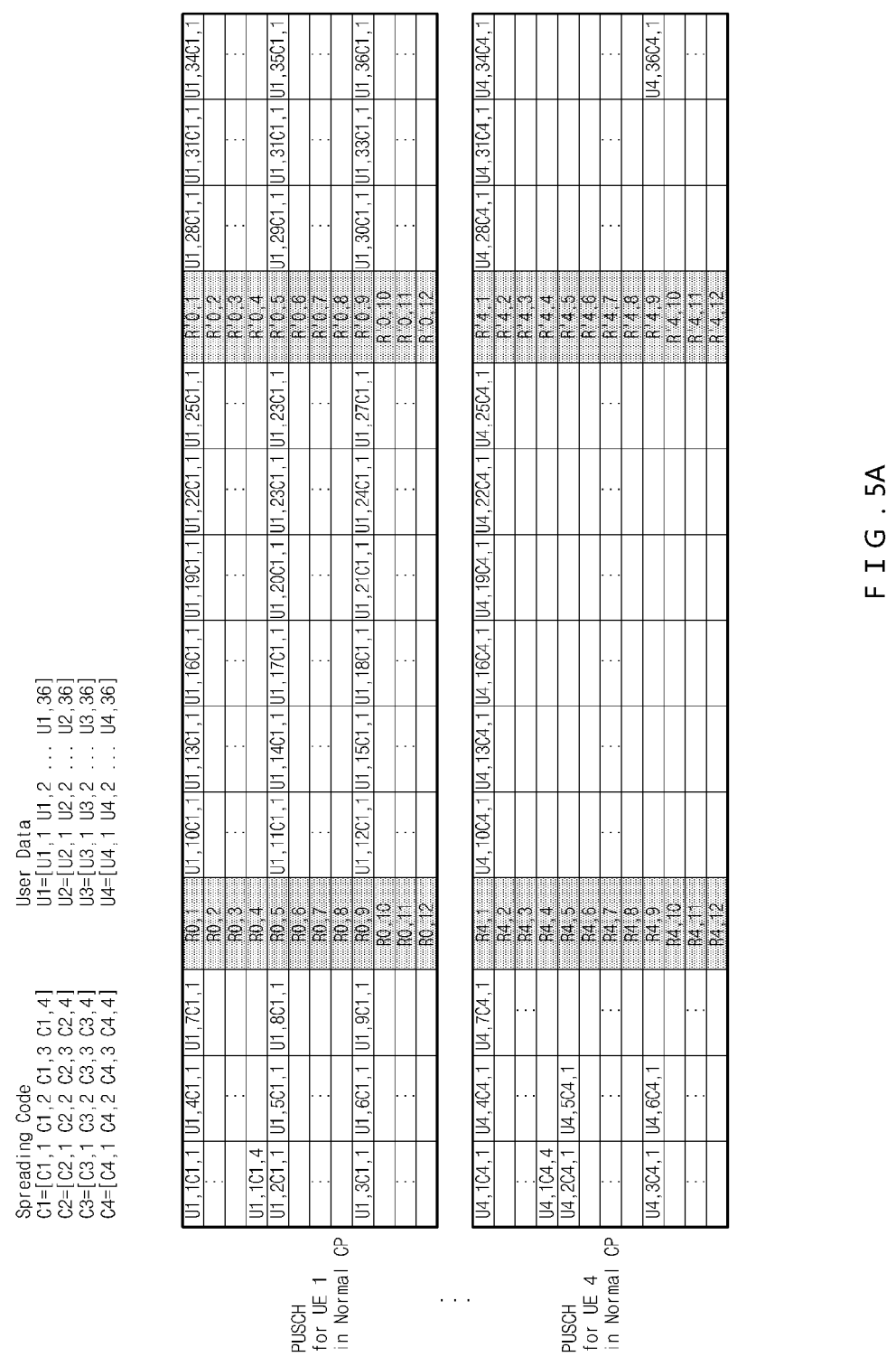
Figure 5B:
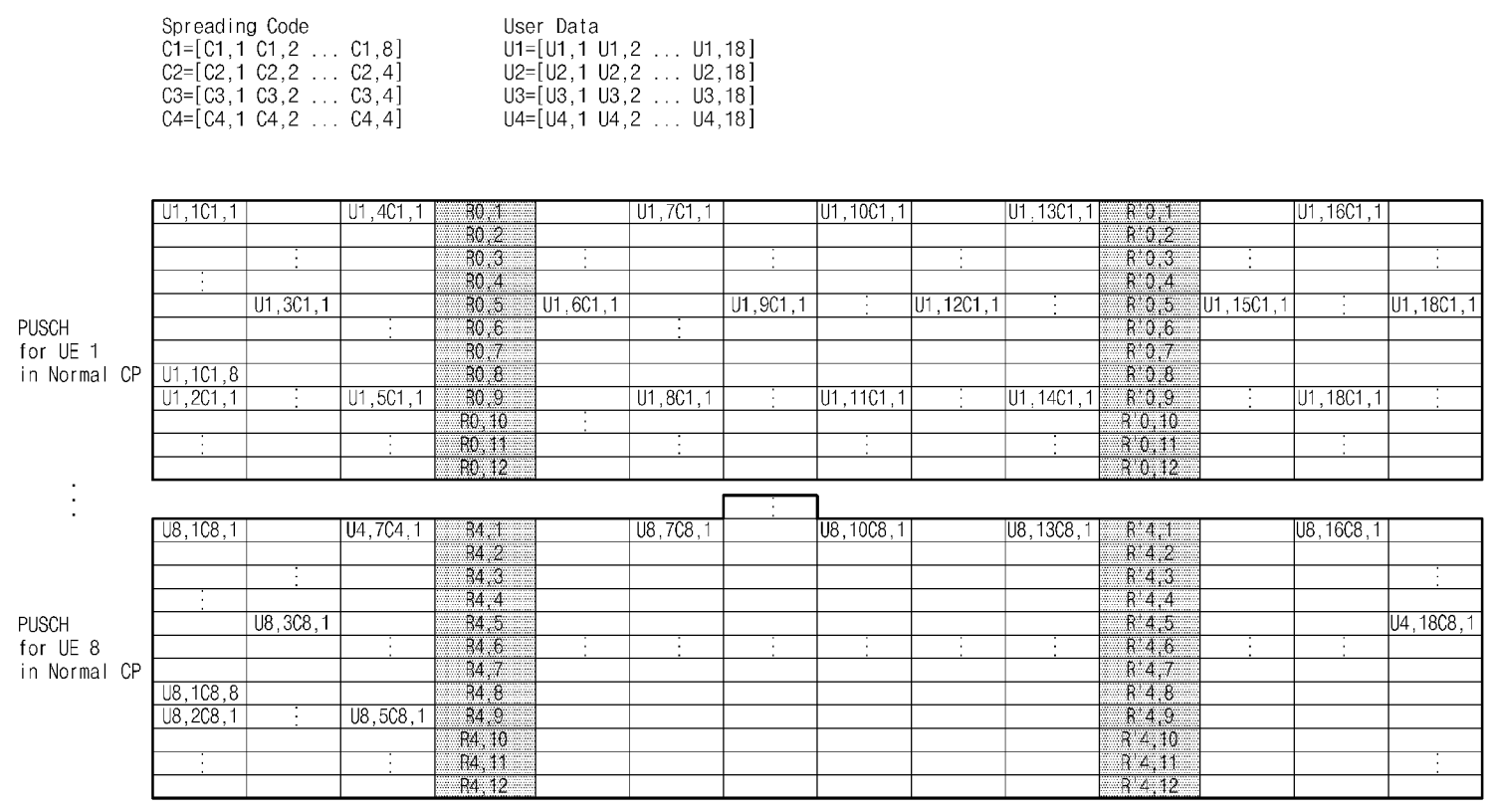

FIGS. 5A and 5B are diagrams for describing an uplink data frame structure using a physical uplink share channel (PUSCH) signal channel for LTE uplink narrowband transmission according to an exemplary embodiment of the present invention. Herein, subframes having the normal CP in the subcarrier are illustrated.

FIG. 5A illustrates the case in which the spreading is performed with the Hadamard code having the spreading code length of 4. Since the length of the spreading code of 4 is used, four user equipments may share and use the same resource block (TB) and FIG. 5A illustrates a method that first allocates the spread data of the user equipment to the frequency axis and thereafter, sequentially allocates the spread data to the time axis. In the method that allocates the spread data of the user equipment, the spread data may be first allocated to the time axis and thereafter, the spread data may be allocated to the frequency axis unlike FIG. 5A and the signal spread in the same data may be allocated by a method that maximally allocates the spread signal in the same data to the same frequency axis or the spread signal may be allocated to be optimized to the environment in which other systems operate. In FIG. 5A, in the case of the normal CP, since 144 REs exist, the actual data may be actually transmitted to 36 REs for each of four user equipments. On the contrary, FIG. 5B illustrates the case in which the spreading is performed with the Hadamard code having the spreading code length of 8. Since the length of the spreading code of 8 is used, eight user equipments may share and use the same resource block and FIG. 5B illustrates a method that first allocates spread data of the user equipment to the frequency axis and thereafter, sequentially allocates the spread data to the time axis. In the method that allocates the spread data of the user equipment, the spread data may be first allocated to the time axis and thereafter, the spread data may be allocated to the frequency axis unlike FIG. 5B and the signal spread in the same data may be allocated by a method that maximally allocates the spread signal in the same data to the same frequency axis or the spread signal may be allocated to be optimized to the environment in which other systems operate. In FIG. 5B, in the case of the normal CP, since 144 REs exist, the actual data may be actually transmitted to 18 REs for each of eight user equipments. Herein, the user equipments that share one resource block have the same adaptive modulation and coding (AMC) format in order to facilitate the resource allocation without interference between signals of the user equipments. That is, the user equipments that receive the similar type of service (e.g., voice) perform the resource allocation to share the resource block. Even in the case of the extended CP, the same method may be applied.

Next, in the case of the uplink, since a common reference signal is not used for demodulation, reference signals for demodulating signals of user UEs that share the basic transport block also need to be transmitted to be distinguished at a receiver unlike the downlink. To this end, in the uplink, the reference signals for the demodulation also need to be transmitted orthogonally by users who share the basic transport block. In the case of a user equipment having the basic transport block size in the existing LTE uses Zadoff-Chu sequence having a length of 12 as a reference signal. Herein, a cyclic shift version of the Zadoff-Chu sequence having the same basis generates a reference signal of the cyclic shift version according to the number of user equipments which may maximally share the basic transport block by using orthogonality to each other to allocate the generated reference signal as the reference signal of the user equipment that shares the basic transport block. That is, when the spreading code length is 4, four sequences which have orthogonality including Zadoff-Chu sequences cyclic-shifted by 1 may be generated as reference signals of four user equipments. Further, when the spreading code length is 8, 5 Zadoff-Chu sequences (e.g., 0, 2, 4, 6, and 8) cyclic-shifted by 2 and 3 Zadoff-Chu sequences (e.g., 10, 11, and 12) cyclic-shifted by 1 may be generated as reference signals of eight user equipments among 12 sequences (e.g., No. 1 to No. 11) which have orthogonality including 11 sequences cyclic-shifted by 1. As described above, when a cyclic-shift amount is large, eight sequences may be selected for maximum performance by considering a frequency and time offset, but in some cases, eight other appropriate sequences among 12 sequences (e.g., No 0 to No. 11) may be selected and used.

On the contrary, various user equipment signals share the basic LTE transport block by adopting the spreading code, and as a result, a base station needs to notify, to the user equipment, which user equipment signal shares the basic LTE transport block and what the spreading code allocated to the user equipment that shares the basic transport block is and which reference signal is used, for the low-rate data transmission. In the case of the existing LTE, what the transport block allocated to each user is and what a transport parameter is in each transport block are notified through a physical downlink control channel (PDCCH) downlink channel. Therefore, spreading code information applied to the user equipment is added to a reserved field of the existing PDCCH channel to use the existing PDCCH channel. Further, in the existing LTE, like a PDCCH channel used for 4*4 multi-input and multi-output (MIMO) or 8*8 MIMO, a method may also be considered, which just uses a field of the channel for the purpose of the present invention by using a PDCCH channel having an appropriate size and an appropriate format among the existing LTE PDCCH channels which are not used for a purpose of a satellite mobile communication system or changing and uses the field to be suitable for transferring low-rate data transmission control information of the present invention. The UE may simultaneously know the reference signal which matches the spreading code together with the spreading code information which the UE needs to use at the time of transmitting the data based on the spreading code information transmitted by the base station. As described above, the UE generates the reference signal of the cyclic shift version to use the reference signal which matches the corresponding spreading code.

FIG. 6 illustrates another example of various low-rate data transmission methods in a user equipment depending on various modulation method sand coding rates in the present invention.

It can be seen that various uplink low-rate data may be transmitted according to various modulation method and coding rates as illustrated in FIG. 6 by such a method. In FIG. 6, when the spreading code length is 4, since the transport block size is the same as the transport block size supported on the basic LTE specification, compatibility with the existing LTE data format may be provided. Of course, a value other than the transport block size supported on the LTE specification may be applied and in this case, it is advantageous that the value may be applied to low-rate data transmission adopting the spreading code depending on the efficient modulation and coding method of the present invention in low-rate data transmission having a lower speed.

Figure 7:
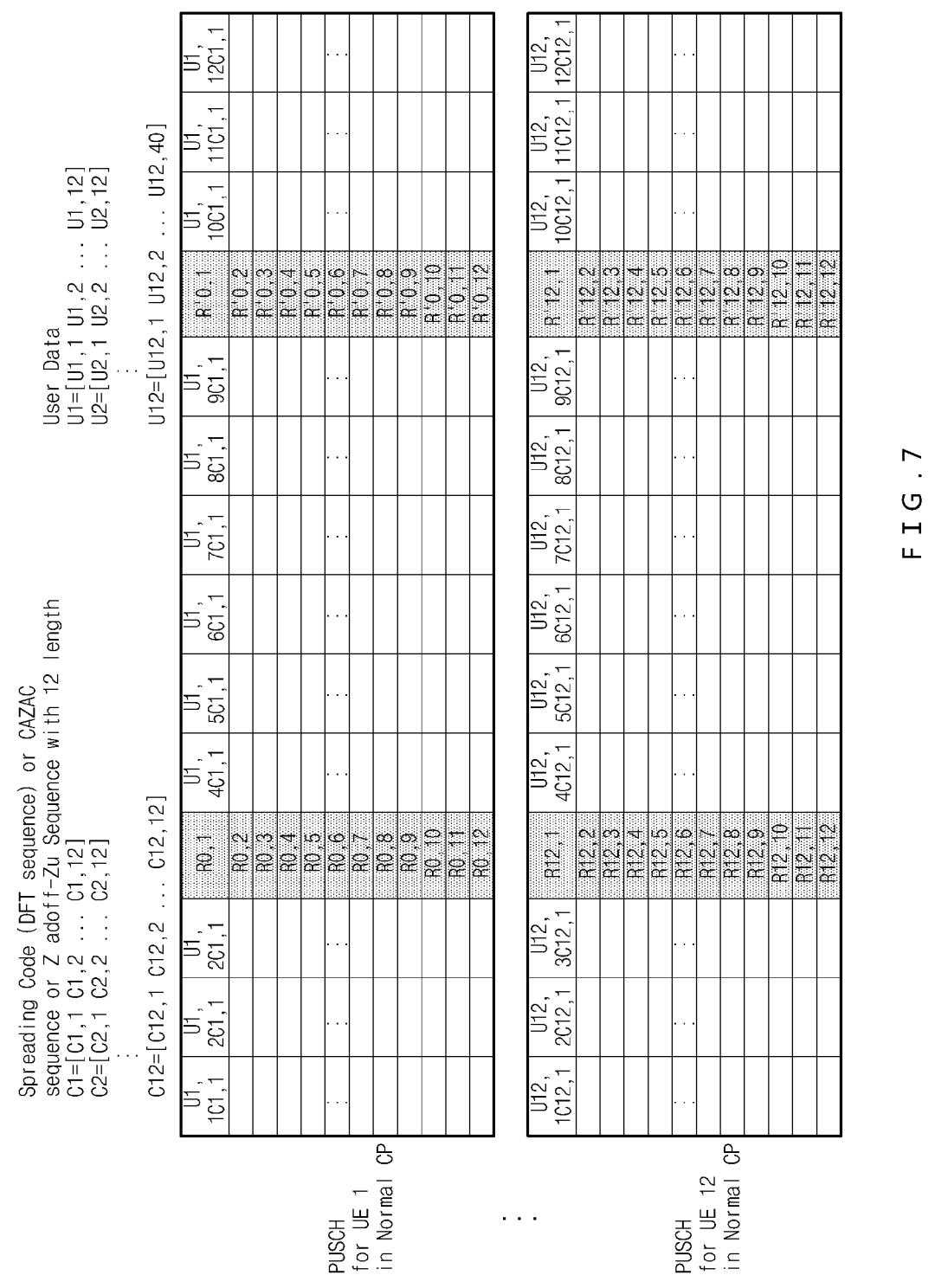

FIG. 7 illustrates the case of spreading coding using a discrete Fourier transform (DFT) sequence, a CAZAC sequence, or a Zadoff-Chu sequence having a spreading code length of 12 without a Hadamard code having the spreading code length such as 4 or 8 in an uplink.

When the sequence is used, since the length of the spreading code corresponds to 12, 12 user equipments may share the basic transport block and further, since the same type of data is transmitted for each symbol in terms of one user UE, the user data from the transport block is easily mapped to the physical channel resource and since a characteristic of the spreading code has a low PAPR property, it is advantageous in that a characteristic resistant to non-linearity of the power amplifier may be provided in terms of the UE which is sensitive to cost of the power amplifier. In this case, in regard to the spreading code for spreading each user equipment data, the DFT sequence, the CAZAC sequence, or the Zadoff-Chu sequence may be just applied even to spreading of a data signal for the reference signal used to distinguish the reference signal of each user equipment in FIG. 6, in order to easily apply the spreading code.

FIG. 8 illustrates yet another example of various low-rate data transmission methods in a user equipment depending on various modulation method sand coding rates in the present invention.

As illustrated in FIG. 8, when the length of the spreading code is increased, the transport block size for one user equipment, which may be allocated to the transport block is decreased. This may be still smaller than 16 which is a minimum transport block size of the LTE, and as a result, in this case, newly defining a transport block having a size smaller than the LTE transport block size in addition to the LTE transport block size is required. When the transport block having the small size is newly defined as described above, compatibility with the existing LTE transport block may not be maintained, but lower-speed data may be supported. As illustrated in FIG. 8, since the size of a basic coding bit is small, applying the convolutional code is more advantageous than the turbo code and when the QPSK and the ¼ coding rate are applied, low-rate data of 600 bps may be supported, and as a result, it is advantageous in that the method may be used as a text message service for safety confirmation or emergency rescue when an emergent disaster occurs.

Figure 9:
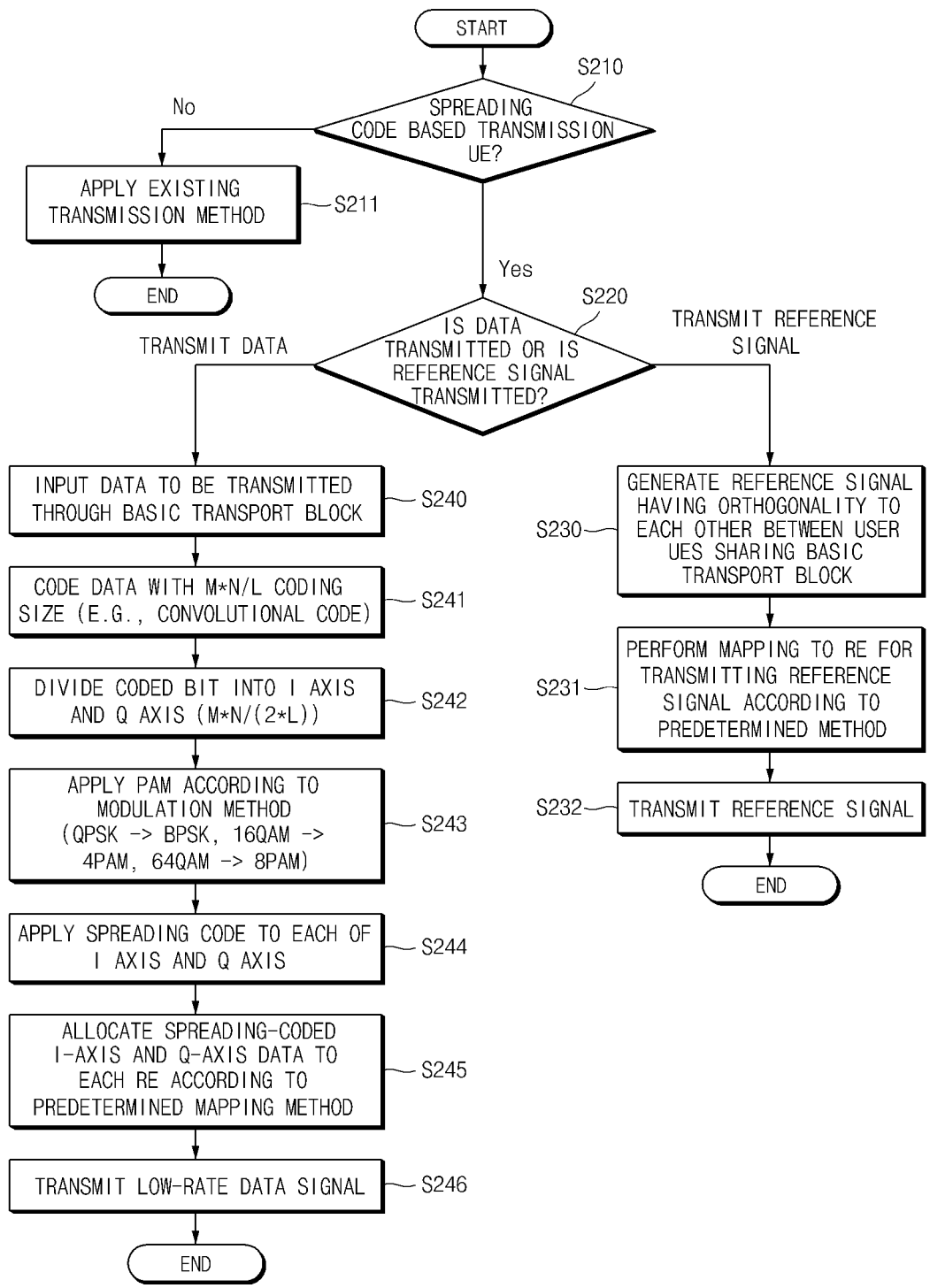
FIG. 9 illustrates another example of the flowchart for describing the low-rate data transmission method in the user equipment (UE) using the spreading code in the present invention.

Hereinafter, the low-rate data transmission method in the user equipment (UE) using the spreading code according to another exemplary embodiment of the present invention will be described in more detail with reference to the flowchart of FIG. 9.

First, the base station communicates with the UE to verify whether to support the transmission method of the present invention and whether the low-rate data transmission described in the present invention is required (S210). When the user equipment is not the user equipment for the low-rate data transmission, in which the spreading code based signal transmission is available, the existing LTE transport resource block is allocated, and as a result, the UE transmits data by the existing LTE method (S211).

In the case of the UE for low-rate data transmission in which the signal may be transmitted based on the spreading code, the base station allocates the basic transport block (TB) shared by the corresponding low-rate data transmission UEs in order for the plurality of target UEs to transmit data by using the corresponding spreading code by sharing the same basic transport block described above. According to the resource allocation of the base station, by using the information on the spreading code added to the reserved field of the physical downlink control channel (PDCCH) or using a predetermined PDCCH channel which is not used for the satellite communication in the base station, the radio interface applies the corresponding spreading code to transmit data, as described even above.

As a result, in the radio interface of the present invention, the transmission data is allocated to the resource elements (REs) of the basic transport block (TB) to transmit the reference signal for the demodulation and the spreading code based data through the basic transport block.

First, each UE may generate the reference signals orthogonal to each other with respect to the plurality of target UEs in order for the plurality of target UEs to transmit the reference signal which matches the corresponding spreading code by sharing the same basic transport block based on the spreading code information sent by the base station (S230). The radio interface allocates the generated reference signal to the resource elements (REs) of the basic transport block according to the predetermined mapping method (S231). As a result, the radio interface may modulate the reference signal allocated to the resource element according to the predetermined modulation method and transmit the modulated reference signal (S232). Herein, the modulation method may be a fixed modulation method such as the QPSK, or the like and in some cases, other fixed modulation methods such as the QAM, and the like may be used.

In the data transmission, the plurality of target UEs share the same basic transport block to transmit respective data by using the corresponding spreading data as described even above. To this end, the radio interface of each UE first receives the transmission data to be transmitted through the basic transport block (S240). Hereinafter, processes which are similar to steps S110 to S190 of FIG. 4 may be performed in the data transmission.

That is, in the radio interface, the transmission data to be transmitted through the basic transport block is first coded with the MN/L (M represents the number of the resource elements (REs) of the basic transport block, L represents the length of the spreading code, and N represents the number of bits per symbol depending on the modulation method) coding size (S241). In this case, as described even above, coding may be performed by using the convolutional code. Further, herein, the radio interface may appropriately select the aforementioned spreading code according to a channel state, and the like.

The radio interface modulates the coded data in the corresponding modulation method by selecting predetermined modulation methods such as QPSK, QAM, and the like according to the channel state, and the like (S243) by dividing into an imaginary (I) axis and a quadrature (Q) axis (S242). For example, as well known, the BPSK and four phases are applied to predetermined signals in each modulation method to perform the QPSK modulation and pulse amplitude modulation (PAM) is applied to the predetermined signals to perform the QAM modulation.

Next, in the radio interface, the spreading code described above is applied to the I axis and the Q axis of the modulated data (S244) and the I-axis and Q-axis data to which the spreading code is applied are allocated to the respective resource elements according to a predetermined mapping method (S245). As described even above, by using the information on the spreading code added to the reserved field of the physical downlink control channel (PDCCH) or using a predetermined PDCCH channel which is not used for the satellite communication in the base station, the radio interface applies the corresponding spreading code.

Steps S240 to S245 may be performed in the plurality of target UEs that share the basic transport block and in this case, the plurality of target UEs that share the basic transport block apply the spreading codes which have orthogonality to each other and for example, the spreading code such as the Hadamard code having the length of 4 or 8 in which the aforementioned orthogonal variable spreading factor (OVSF) channelization may be used. Further, the spreading code may include a discrete Fourier transform (DFT) sequence, a CAZAC sequence, or a Zadoff-Chu sequence having a length of 12.

The spreading code based transmission data in the plurality of respective target UEs is loaded on the basic transport block to be generated as a predetermined transport block signal as described above and the transmission data may be transmitted through the corresponding narrowband transmission channel (S246). In the present invention, the narrowband transmission channel that shares the basic transport block is separated from the existing LTE transmission channel to transmit data, thereby maintaining the compatibility with the existing LTE UE. Further, in the present invention the convolutional code is applied to the corresponding transport block size which decreases as compared with the existing LTE in the satellite communication and it may be advantageous to support the low-rate data service including a spreading code based text message.

As described above, in the present invention, the spreading code corresponding to the transport block size which decreases as compared with the existing LTE is applied to the plurality of target UEs allocated to the basic transport block and each transmission data spreads to allow transmission target UEs of the number corresponding to a maximum length of the spreading code to transmit data through the same basic transport block. Further, in communication of the portable terminals for the LTE based satellite communication, the spreading code is applied to the basic transport block while maintaining the compatibility with the existing radio interface and the link margin is improved by sharing the basic transport block to easily support the low-rate data transmission.

Although the present invention has been described above with reference to predetermined matters such as specific constituent elements, limited exemplary embodiments, and drawings, they are provided only to assist the overall understanding of the present invention and not to be limiting of the present invention and thus, the present invention is not limited to the exemplary embodiments and those skilled in the art may make various changes and modifications without departing from the scope of the present invention. Accordingly, the spirit of the present invention should not be defined by the exemplary embodiments. The claims and the equivalents thereof should be understood to fall within the scope of the present invention.

What is claimed is:

1. A low-rate data transmission method in a radio interface, the method comprising:
   allocating transmission data to resource elements of a basic transport block to which a spreading code is applied, to be shared by a plurality of target UEs; and
   transmitting data based on the spreading code through the basic transport block for signal transmission, wherein the plurality of target UEs share the same basic transport block to transmit data by using the corresponding spreading code, wherein the allocating includes:
coding the transmission data with the MN/L (M represents the number of the resource elements (REs) of the basic transport block, L represents the length of the spreading code, and N represents the number of bits per symbol depending on the modulation method) coding size;
dividing the coded data into an I axis and a Q axis and modulating the divided data by a predetermined modulation method;
applying the spreading code to the I axis and the Q axis of the modulated data; and
allocating the I axis and Q axis data to which the spreading code is applied, to the respective resource elements.

2. The method of claim 1, wherein in communication of portable terminals for LTE based satellite communication, the spreading code is applied to the basic transport block while maintaining compatibility with the existing radio interface and a link margin is improved by sharing the basic transport block to support the low-rate data transmission.

3. The method of claim 1, wherein the spreading code corresponding to the transport block size which decreases as compared with the existing LTE is applied to the plurality of target UEs allocated to the basic transport block and each transmission data spreads to allow transmission target UEs of the number corresponding to a maximum length of the spreading code to transmit data through the same basic transport block.

4. The method of claim 1, wherein the basic transport block includes a resource constituted by 12 subcarriers having a size of 15 kHz and one subframe having a size of 1 ms.

5. The method of claim 1, wherein the plurality of target UEs that share the basic transport block transmits transmission data to which spreading codes orthogonal to each other are applied.

6. The method of claim 1, wherein in the coding, the data is coded by using a convolutional code.

7. The method of claim 1, wherein the spreading code includes a Hadamard code having a length of 4 or 8, in which orthogonal variable spreading factor (OVSF) channelization is available.

8. The method of claim 1, wherein in the allocating, the spreading code is applied by using the information on the spreading code added to the reserved field of the physical downlink control channel (PDCCH) or using a predetermined PDCCH channel which is not used for the satellite communication.

9. The method of claim 1, wherein a narrowband transmission channel that shares the basic transport block is separated from the existing LTE transmission channel to transmit data, thereby maintaining the compatibility with the existing LTE UE.

10. The method of claim 1, wherein the spreading code includes a discrete Fourier transform (DFT) sequence, a CAZAC sequence, or a Zadoff-Chu sequence having a length of 12.

11. The method of claim 1, wherein the convolutional code is applied to the corresponding transport block size which decreases as compared with the existing LTE and a low-rate data service including a text message based on the spreading code is supported.

12. A low-rate data transmission method in a radio interface, the method comprising:
allocating transmission data to resource elements of a basic transport block to which a spreading code is applied, to be shared by a plurality of target UEs; and
transmitting data based on the spreading code through the basic transport block for signal transmission,
wherein the plurality of target UEs share the same basic transport block to transmit data by using the corresponding spreading code
wherein the method further comprises:
determining, by a base station, whether a corresponding UE is a UE which is able to transmit a signal by sharing the basic transport block based on the spreading code; and
allocating, by the base station, the existing LTE transport resource block to UEs which are not able to transmit the signal based on the spreading code and allocating the basic transport block for transmitting the signal based on the spreading code to UEs which are able to transmit the signal based on the spreading code to share the basic transport block to allow the plurality of target UEs to transmit data by sharing the basic transport block.

13. A low-rate data transmission method in a radio interface, the method comprising:
generating a reference signal for demodulation;
allocating the reference signal generated to have orthogonality to each other with respect to a plurality of target UEs to resource elements of a basic transport block; and
transmitting the reference signal through the basic transport block for signal transmission,
in order to transmit data based on the spreading code by allocating transmission data to the resource elements of the basic transport block, coding the transmission data with the MN/L (M represents the number of the resource elements (REs) of the basic transport block, L represents the length of the spreading code, and N represents the number of bits per symbol depending on the modulation method) coding size;
dividing the coded data into an I axis and a Q axis and modulating the divided data by a predetermined modulation method;
applying the spreading code to the I axis and the Q axis of the modulated data, and
allocating the I axis and Q axis to which the spreading code is applied, to the respective resource element,
wherein the plurality of target UEs share the same basic transport block to transmit data by using a corresponding spreading code.

* * * * *